March 3, 1970 G. W. GRAVES ET AL 3,498,315

CORROSION RESISTANT BALL CHECK VALVE

Filed April 24, 1968

Gail W. Graves
Clarence H. Hester
INVENTORS

BY James F. Weiler
William A. Stout
Paul L. DeVerter II
Dudley R. Dobie, Jr.

ATTORNEYS

United States Patent Office 3,498,315
Patented Mar. 3, 1970

3,498,315
CORROSION RESISTANT BALL CHECK VALVE
Gail W. Graves and Clarence H. Hester, Houston, Tex.,
  assignors to John L. Doré Co., Houston, Tex., a corporation of Texas.
Filed Apr. 24, 1968, Ser. No. 723,713
Int. Cl. F16k *15/04;* F16l *58/00*
U.S. Cl. 137—375                                        5 Claims

ABSTRACT OF THE DISCLOSURE

The invention relates to a ball check valve formed of two complementary body members each defining one-half of a body cavity, one body member being lined completely interiorly with a liner having an annular raised face forming a seat. The other body member is likewise provided with a liner member completely covering the interior thereof and provided with a plurality of stops. Both liners have axial vanes circumferentially spaced around the body cavity within which is disposed a slidable seal member which may seat against the raised face to close flow through the valve or which may slide into engagement with the stops to open flow through the valve.

BACKGROUND OF THE INVENTION

Ball type check valves for limiting flow in one direction therethrough are well known in the art as are such valves having certain types of liners therein to inhibit corrosion. For example, there are several forms of conventional valves having the body or housing constructed of steel with an interior liner fabricated from plastic material to provide a valve that will resist corrosion. Moreover, such conventional lined valves have met and in some instances have overcome problems of excessive liner expansion at high temperatures followed by permanent deformation (cold flow) upon cooling down. However, even the more successful conventional valves in many instances are hampered in operation by binding of the closure mechanisms, are in many cases not capable of full flow of fluid therethrough relative to the size of the pipe in which the valve is connected, are not easily serviced and suffer build-up of debris therein, or in many instances are so complex in structure that they are available only at high costs.

The invention is directed to a ball type of check valve which effectively overcomes these problems of prior art devices yet is remarkably simple in structure and quite economical to construct and maintain.

SUMMARY OF THE PRESENT INVENTION

The ball check valve of the invention is of the type that may be placed in a conduit in which fluid flow therethrough is to be limited to one direction only. In other words, flow is in one direction or there is no flow at all through the valve. Generally speaking, the valve is formed of a housing having a pair of complementary body members both of which are lined with corrosion resistant material, the liners completely covering the interior thereof and overlapping at the joint between the body members so as to be sealingly secured. Both liners have abutting, aligned axial vanes to guide a ball member disposed within the body cavity of the valve whereby fluid may flow between the vanes and around such ball member when the ball is resting at one end of the valve against stop means. The valve is closed when flow therethrough attempts to reverse itself thereby forcing the ball member to the other end of the valve against a raised face seat integrally formed of the liner.

The check valve of the invention has highly advantageous features in that the ball member thereof will not stick to cause malfunction even when the ball is in a checked position for long periods of time. It is, therefore, an object of the invention to provide a check valve having unique non-stick properties and minimal frictional hindering of fluid flow therethrough.

Another object of the invention is the provision of a ball type check valve wherein any hammering action by fluid flowing through the valve against the ball has little or no detrimental effect on durability or operational stability of the valve. Similarly, even the most severe hammering action of fluid will not cause galling.

Still another object of the invention is the provision of a ball check valve wherein full flow of fluid is maintained when the valve is opened, the interior structure of the valve being such that even at full flow there is minimal pressure drop through the valve due to minimal restrictions in the flow path and low coefficient of friction of the interior members of the valve.

Still another object of the invention is the provision of such a valve that is easily and inexpensively constructed yet is durable and uniquely sealed to prevent leakage upon expansion during operation at high temperatures or contraction during operation at lower temperatures, while at the same time resisting attack by any corrosive media that might flow through the valve.

Other and further objects, features and advantages will be apparent in the following description of the preferred embodiment of the invention taken in conjunction with the accompanying drawing.

DESCRIPTION OF THE DRAWING

In the accompanying drawing, like character references designate like parts throughout the several views wherein.

DESCRIPTION OF THE PREFERRED EMBODIMENT

Figure 1:
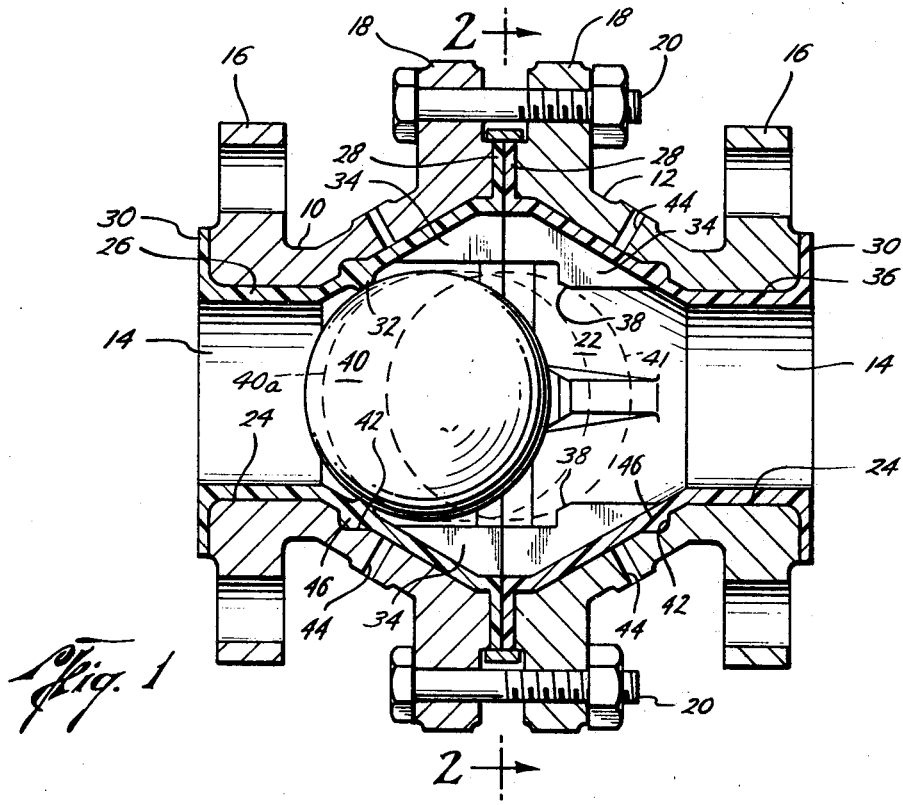
FIGURE 1 is a partial cross-sectional side view of the valve of the invention.

Referring to the drawing, the valve of the invention has a housing constructed of a pair of complementary body members 10 and 12 which join along a line extending at right angles to a flow passage 14 through which fluid flows through the valve. The outer ends of each body member have outwardly projecting radial flanges 16 whereby the valve can be connected to flanged pipe. The two body members 10 and 12 also have outwardly projecting radial flanges 18 at the inner end of each such body member so as to be held together by clamping means such as bolts 20 which pass through holes in the flange members 18. The complementary body members 10 and 12 each define substantially one-half of a body cavity 22, such body cavity actually being a part of the flow passage 14 further formed by ports 24 provided at the outer ends of each of the body members 10 and 12.

Secured to and completely covering the interior of the body member 10 is a liner member 26 having a portion 28 overlapping the face of the radial flange 18 and another portion 30 overlapping the face of the outer flange 16. The liner 26 is formed of a somewhat resilient material such as polytetrafluoroethylene, a fluorocarbon polymer marketed under the trademark "Teflon." Other fluorocarbon polymers may be used to form the liner as may other corrosion resistant polymers such as polypropylene, vinyl polymers such as polyvinyl chloride and the like. Preferably, any such liner material should have a low coefficient of friction as well as resistance to chemical attack.

A raised face 32 is integrally formed of the liner 26 annularly about the port 24 portion of the liner and within the cavity portion 22 so as to provide a seat. Also formed integrally of the liner 26 are a plurality of axial vanes 34 projecting into the body cavity 22 and spaced about the circumference of such cavity.

Figure 2:
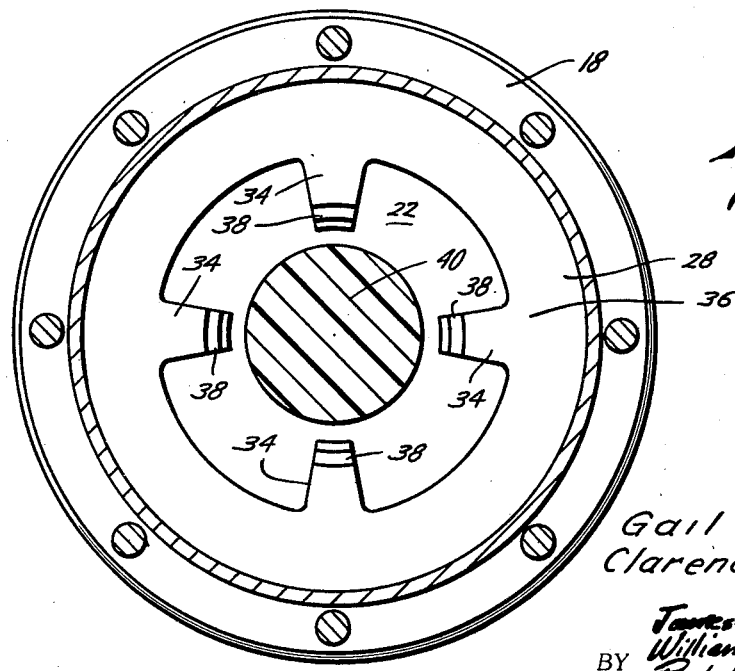
FIGURE 2 is a cross-sectional view transversely of the valve taken along the line 2—2 of FIGURE 1.

A second liner member 36 is secured completely about the interior surface of the other body member 12 and likewise has a portion 28 overlapping the face of the radial flange 18 as well as an outer overlapping portion 30 at the face of the outer flange 16. The second liner member 36 has vanes 34 which abut and are aligned with the corresponding vanes 34 of the first liner member 26. In addition, each of the vanes 34 integrally formed of the second liner member 36 has a stop 38 adjacent the port 24 portion of the liner and extending inwardly into the body cavity 22. Such vanes and stops are more clearly viewed in FIGURE 2.

Disposed within the body cavity 22 is a slide-seal member such as a ball 40 of a diameter such that it will fit intermediate the vanes 34 while at the same time being able to seat against the annular raised face 32 to seal such end of the cavity 22 when so engaged. The ball 40 is slidable axially of the valve along the path defined by the vanes 34 and is engageable at the opposed end of the body cavity with the stops 38 of each vane. When so engaged with the stops, fluid may still flow about the periphery of the ball between the vanes 34, such flow area preferably being as great as the flow area through the ports 24 of each of the body members.

The body members 10 and 12 are identical in structure and are thereby interchangeable contributing to economy by greatly reducing casting costs and the like. Preferably, both body members are provided with inwardly opening recesses 42 on the cavity side of each member as well as a plurality of vent apertures 44. The liners 26 and 36 are molded by conventional techniques into the respective body members, such molding operation also forming the annular raised seat 32, the vanes 34, and the stops 38. During the molding operation, the liner 26 is provided with an outer annular projection 46 to fill the recess 42 as is true of the liner member 36. Such annular projecting portions of the liners acting against the recesses 42 provide backup for the liners during any hammering of the ball 40 that might otherwise cause the liners to pull away from the body members. It will be recognized that the recesses 42 filled by the liner projections 46 may take any other suitable configuration such as dovetails and the like.

The vent holes 44 in each of the body members permit escape of air during molding of the liners to the body members. Upon completion of the molding operation, inner flanges 18 of both of the body members are placed together as shown in FIGURE 1, with the overlapping portions 28 of each of the liners meshed together between such flanges. Of course, the ball 40 is placed in the body cavity 22 before hand and then the bolts 20 are inserted and tightened to pull the flanges 18 together and thereby form a tight seal between the body members. When the flanges 18 are so drawn together, the vanes 34 of the liners 26 and the liner 36 securely abut each other in alignment. Such secure abutting action of the vanes 34 results in a type of cantilever action by which the vanes 34 maintain both the liners 26 and 36 securely against the walls of the body members 10 and 12 respectively. The liners 26 and 36 are thereby maintained stationary within the body cavity 22 even when the valve is operated under negative fluid pressure.

The resulting assembled device is then appropriately secured within a conduit such as bolting the outer flanges 16 of each of the body members to corresponding flanges of the conduit. When so installed, flow from right to left as viewed in FIGURE 1 will cause the ball 40 to seat against the annular raised face or seat 32 thereby preventing flow through the valve, i.e., the ball is in a "checked position." Upon reversal of flow the ball 30 is slidably forced against the stops 38 whereby flow is permitted completely through the flow passage 14 of the valve. Such open flow position of the ball 40 is shown in dotted outline in FIGURE 1 by the reference numeral 41.

The ball 40 may be constructed of solid, resilient, corrosion resistant materials of varying specific gravities or may simply take the form of a hollow spherical member coated with any such corrosion resistant liner material. In any event, it will be recognized that buoyancy of the ball member 40 may be altered as desired according to the type of fluid being regulated by the valve whether the fluid is gas or a heavy liquid material. Also, the configuration of the ball 40 may be altered to take more of an elongate form if so desired to decrease the distance the ball must travel between the open and close positions. Such elongate form is represented in FIGURE 1 by the dotted outline with reference numeral 40a.

Thus provided is a ball type check valve of simple but unique construction that is resistant to corrosion, durable, and subject to little or no galling or wear under severe operating conditions. The smooth inner surfaces of the valve provided by the liner members reduce the possibility of build-up of minimal flow restriction and low friction coefficients to promote flow of fluid therethrough with very small pressure drop.

The invention, therefore, is well adapted to carry out the objects and attain the ends and advantages mentioned as well as others inherent therein.

What is claimed is:

1. A corrosion resistant check valve for limiting flow therethrough to a single direction comprising:
   a pair of complementary body members in juxtaposition, each defining substantially one-half of a body cavity and each having:
      a port at the outer end thereof, and
      an outwardly projecting radial flange at the inner and outer ends of each body member;
   a first corrosion-resistant liner member secured about the complete interior surface of one of the body members and overlapping the face of the radial flange thereof, said liner member having:
      a raised face annularly about the port and within the cavity portion,
      a plurality of axial vanes projecting into the body cavity and spaced about the circumference of the cavity;
   a second corrosion-resistant liner member secured about the complete interior surface of the other body member and overlapping the face of the radial flange thereof, said second liner member having:
      a plurality of axial vanes projecting into the body cavity and spaced about the circumference of the cavity in abutting, aligned relation with the vanes of the first liner member,
      each vane having a stop extending inwardly into the body cavity and adjacent the port;
   a slide-seal member formed of corrosion-resistant material and disposed within the body cavity so as to sealingly contact the raised face of the first liner yet slidable within the vanes of the liner members so as to contact the stops of the vanes of the second liner member; and
   clamping means for securely connecting the inner radial flanges of each body member such that the portions of the first and second liner members overlapping the faces of the flanges are sealingly meshed together between said flanges.

2. The invention of claim 1 wherein the slide-seal member is of a spherical configuration.

3. The invention of claim 1 wherein the slide-seal member is of an elongate configuration.

4. The invention of claim 1 wherein the first and second liner members and the slide-seal members are formed of a fluorocarbon polymer.

5. The invention of claim 1 wherein each body member has an inwardly opening annular recess in its inner wall transversely of the axis of the valve into which the liner member thereof projects at a point contiguous to contact of the side-seal member with the liner member.

References Cited

UNITED STATES PATENTS

| | | | |
|---|---|---|---|
| 1,092,782 | 4/1914 | Miles | 137—533.11 XR |
| 2,071,391 | 2/1937 | Crowell | 137—375 XR |
| 2,094,264 | 9/1937 | Crowley | 137—533 XR |
| 3,176,713 | 4/1965 | McDermott et al. | 137—533.15 |
| 3,334,650 | 8/1967 | Lowrey et al. | 137—375 |
| 3,336,939 | 8/1967 | Freed et al. | 137—375 |
| 2,998,024 | 8/1961 | Marette et al. | 137—625.27 |

FOREIGN PATENTS

| | | |
|---|---|---|
| 931,140 | 8/1955 | Germany. |
| 138,405 | 2/1920 | Great Britain. |

HENRY T. KLINKSIEK, Primary Examiner

U.S. Cl. X.R.

137—533.11, 525